Dec. 20, 1966     A. R. BLACKADDER ETAL     3,293,348
FLIGHT TRAINING APPARATUS

Filed Aug. 27, 1962     3 Sheets-Sheet 1

INVENTORS
ALEXANDER R. BLACKADDER
MEVILLE L. SHELLEY

BY
*Larson and Taylor*
ATTORNEYS

Dec. 20, 1966   A. R. BLACKADDER ETAL   3,293,348
FLIGHT TRAINING APPARATUS
Filed Aug. 27, 1962   3 Sheets-Sheet 2

INVENTORS
ALEXANDER R. BLACKADDER
MEVILLE L. SHELLEY
BY
Larson and Taylor
ATTORNEYS Dec. 20, 1966  A. R. BLACKADDER ETAL  3,293,348
FLIGHT TRAINING APPARATUS
Filed Aug. 27, 1962  3 Sheets-Sheet 3

INVENTORS
ALEXANDER R. BLACKADDER
MEVILLE L. SHELLEY
BY
*Larsen and Taylor*
ATTORNEYS

United States Patent Office 3,293,348
Patented Dec. 20, 1966

3,293,348
FLIGHT TRAINING APPARATUS
Alexander Richard Blackadder, Three Bridges, Crawley, and Meville Leslie Shelley, Hurstpierpoint, England, assignors to Communications Patents Limited, London, England
Filed Aug. 27, 1962, Ser. No. 219,567
Claims priority, application Great Britain, Sept. 19, 1961, 33,538/61
14 Claims. (Cl. 35—10.2)

This invention relates to ground-based flight training and flight evaluating apparatus in which visual effects are provided, corresponding to those seen by the crew of an aircraft during actual flight when approaching a landing area provided with a surface-located visual navigational aid, particularly as when approaching an airfield equipped with a visual glide slope indicating system.

In one form of visual glide slope indicating system at present used on airfields and known as the "red/white" system, optical projector units are disposed on each side of the runway to provide two transverse split bars of light straddling the runway at different distances from the runway threshold. Each unit projects a beam of light, the lower part of which is red and the upper part of which is white. The units of the bar nearer the runway threshold are set with light beam centres a few degrees above the horizontal and the units of the other bar have light beam centres set about half a degree higher. When flying through the red and white beam of each bar, a transitory pink stage is observed by the pilot making the approach. The ideal glide path for landing overshoots the nearer bar, which appears white, and undershoots the further bar, which appears red. If the approaching aircraft deviates from the ideal glide path in an upwards direction, the further bar will initially show pink and will finally turn white, both bars then being white and indicating "high." Conversely, if the aircraft deviates from the ideal glide path in a downwards direction, the nearer bar will initially show pink and will finally turn red; both bars will then show red indicating "low."

In modern flight-training, use is made of flight simulators to provide a visual presentation of objects as seen from the flight deck of an aircraft during a low altitude phase of a flight, in addition to providing instrument responses to settings of the flight and engine controls of the aircraft simulated.

The visual presentation to the trainee crew may be provided by an optical lens arrangement viewing a scale model of an airfield and its surroundings having details in natural colours. Alternatively, a television camera may be employed to view the model. The scene presented to the trainee crew is then provided by a television receiver fed with signals from the television camera. The camera is movable relatively to the model, so that the presented view of the model changes correspondingly to the simulated movement of an aircraft.

Runway edge lights and line-and-cross-bar approach lights are included in the model to define the area available for landing and to provide guidance information for azimuth and roll correction, as in an actual flight.

The area represented by the model is necessarily large and as practical space requirements necessitate the use of a relatively small scale for the model, say of the order of one inch on the model representing 100 feet, the simulated light sources must have a diameter of 0.05 inch or less, if the light sources of the presented picture are not to be excessively out of proportion.

In the projectors of an actual red/white system, a red and white fan-shaped beam of light is produced by means of light sources having reflectors focused and aligned to direct a beam of light through a red light filter onto a slot. A similar form of optical unit for simulating the beams of the projector units, having dimensions to the same scale as the model, is impracticable.

It is an object of the present invention to provide, in visual flight training and simulating apparatus, means whereby landing aids of the visual glide slope type may be realistically simulated.

According to the invention, ground-based flight training apparatus for simulating visual effects corresponding to those provided to an aircraft in flight by a surface-located visual navigational aid comprises a representation of a landing area, an optical viewing device for viewing a portion of the representation, means providing relative movement of the viewing device and the said representation in accordance with a simulated or a computed movement of an aircraft relative to the landing area, and means for displaying the scene viewed by said viewing device, including at least one source of light associated with the representation, positioned correspondingly to a light projection unit of said visual navigational aid, and means for varying the character of the light transmitted from the said source of light in accordance with a simulated or computed movement of the aircraft, whereby the scene displayed by said display means shows visual effects corresponding to those provided by said visual navigational aid in relation to an aircraft following said simulated or computed movement.

In order that the invention may readily be carried into effect, two embodiments thereof will now be described in detail, by way of example, with reference to the accompanying drawings, in which.

Figure 1:
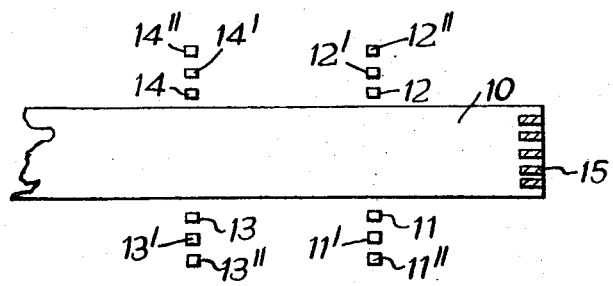
FIG. 1 shows, in diagrammatic form, a plan view of a runway with projector units of an associated visual glide slope system.

Referring to FIG. 1, optical projector units 11, 11′, 11″ and 12, 12′, 12″ provide one of the light bars of a red/white visual approach system. Further optical projector units 13, 13′, 13″ and 14, 14′, 14″ provide the other light bar of the system. Both sets of projector units are located near to the edges of runway 10, of which only a part is shown in the drawing. The projector units 11, 11′, 11″ and 13, 13′, 13″ are on one side of the runway 10 and the projector units 12, 12′, 12″ and 14, 14′, 14″ are on the other side of the runway. The projector units 11, 11′, 11″ and 12, 12′, 12″ are situated at a distance of 500 feet from the runway threshold, which threshold is indicated in the drawing by shaded bars 15. The projector units 13, 13′, 13″ and 14, 14′, 14″ are normally situated at a distance of 1,000 feet from the runway threshold, but this distance may be increased up to 1,500 feet in those cases where discrimination between the two light bars at ranges appreciably greater than 5 miles is necessary.

Each optical projector unit contains light sources and reflectors focused and aligned onto a slot. Immediately in front of each light source is a red filter glass, positioned so that the upper half only of the light source is covered. Each projector unit produces a fan-shaped beam, covering about 30 degrees in azimuth and about 8 degrees in elevation. Brightness controls are provided to enable the brightness of the sources to be set to optimum levels for day and for nights landings or to suit particular weather conditions.

Figure 2:
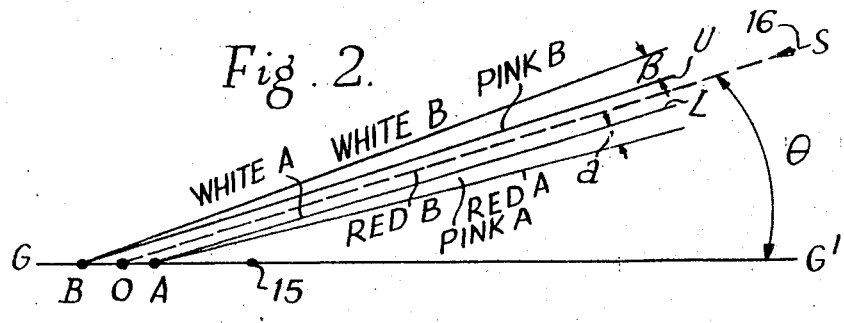
FIG. 2 shows, in diagrammatic form, colour sectors, in a vertical plane, established ahead of the runway threshold, by the visual glide slope system of FIG. 1.

Referring to FIG. 2, the optical projector units 11 and 13 of FIG. 1 are represented by A and B respectively. Ground level of the runway 10 is represented by the line G–G' and the threshold of the runway by the reference 15. The direction of approach of an aircraft making use of the landing system is shown by the arrow 16.

The upper and lower sectors of the beam of light emerging from each of the projector units A and B are white and red respectively. Between these upper and lower sectors there is a transition sector, where the colour seen shades from white through pink to red, passing in the downward direction through the transition sector. The two transition sectors, formed by the units A and B respectively, are represented by A and B respectively in FIG. 2. Each transition sector subtends an angle of from ¼ to ½ degree.

When the approach system is installed, the beams $\alpha$ and $\beta$ are both oriented relatively to the ground level so that the centre of the lane formed between them, represented in FIG. 2 by a line O–S, lies on the glide-path. The angle formed by a glide-path O–S with the ground plane G–G' is represented by $\theta$.

Figure 3:
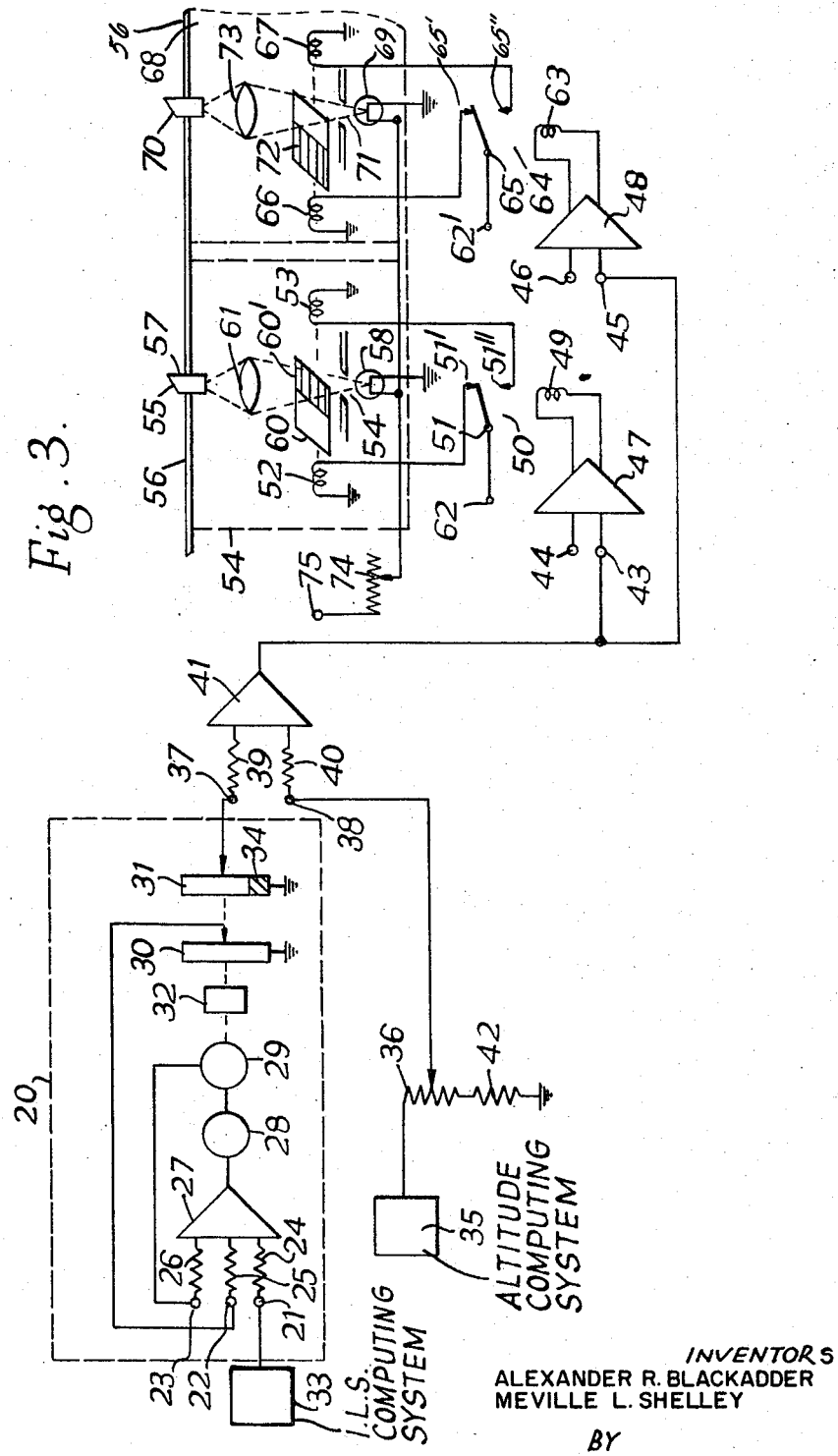
FIG. 3 is a schematic diagram showing a servo controlled optical arrangement providing approximate simulation of the visual glide slope system of FIG. 1

A servo-controlled optical arrangement is shown in FIG. 3 by means of which visual effects may be produced in flight simulating apparatus, similar to those observed in real flight when making an approach with the red/white landing system described.

In the simulating system, light sources are located on a model, at positions corresponding to the projectors of the simulated red/white system. Instead of the split-colour beam of the actual system, light of one colour only is emitted by each simulating source at any one time. The change of colour of the two groups of lights is then determined by computing means controlled from the height of the simulated aircraft and its distance from the runway.

Referring to FIG. 3, a computing servo, shown within the broken outline 20, is fed at input terminal 21 with an alternating current electric signal of amplitude corresponding to the horizontal distance of the simulated aircraft from a pre-determined reference position on the runway.

In the computing servo 20, which in this example is of conventional design, input terminals 21, 22 and 23 are connected by way of summing resistors 24, 25 and 26 respectively to the input of an amplifier 27. The output of the amplifier is fed to a motor 28, the output shaft of which directly drives a feed back generator 29 and drives potentiometers 30 and 31 through a speed reduction gear 32.

The windings of the potentiometers 30, 31 are supplied from a source of alternating current used to supply the computing system of the associated flight simulator, and each potentiometer is connected to earth at one point. From the wiper of potentiometer 30, an "answer" signal is fed to terminal 22, to cause the servo motor 28 to take up a position corresponding to the signal fed to terminal 21. The feedback generator 29 provides a stabilising, rate feedback signal to input terminal 23.

The input signal fed to terminal 21 is obtained from a computing system 33, used to operate the indicator of the instrument landing system (I.L.S.) in the flight simulator. The amplitude of this signal corresponds to the horizontal distance between the simulated aircraft and a localiser transmitter, situated at the end of the runway remote from the threshold 15 of the runway, see FIGS. 1 and 2.

The ideal glide path of this simulating system is defined by an electric signal derived from the wiper of potentiometer 31. The amplitude of this signal increases linearly from zero, with increasing distance of the wiper from a position O' on the winding of the potentiometer 31. The winding is shorted out for a distance indicated by the shaded area 34, which distance corresponds to the distance between the origin of the glide path and the localiser transmitter. The position O' therefore corresponds to the point O in FIG. 2.

In the flight simulator, the height above ground of the simulated aircraft is determined in an altitude computing system 35. A signal corresponding to simulated height is fed to a potentiometer 36.

Signals from the wipers of potentiometers 31 and 36 are fed, in opposite phase relationship, to input terminals 37 and 38 respectively of an amplifier 41. Terminals 37 and 38 are connected to the amplifier by way of summing resistors 39, 40 respectively. The values of the summing resistors 39, 40 are chosen so that the input voltage to the amplifier 41 is zero when the height of the simulated aircraft, at the distance from the runway represented by the input signal fed to terminal 21, corresponds to that of the ideal glide path. The glide path angle, shown in FIG. 2 as $\theta$, is adjusted to the desired value by means of the potentiometer 36. A resistor 42 is connected between the winding of potentiometer 36 and earth. The value of resistor 42 is chosen so that the glide path angle has a maximum permissible value when the wiper is located at that end of the winding which is connected to resistor 42.

When the path of the simulated aircraft deviates from the established glide path, a signal is present at the output of amplifier 41. The phase of this signal corresponds to that of the signal fed to terminal 38, when the simulated aircraft is above the glide path, and to that of the signal fed to terminal 37, when the simulated aircraft is below the glide path.

The signal from the output of amplifier 41 is fed to input terminals 43 and 45 of amplifiers 47 and 48 respectively. Amplifiers 47 and 48 are of conventional design in this example and include phase sensitive rectifiers. A reference voltage is fed to input terminals 44 and 46 of amplifiers 47 and 48 respectively. The phase sensitive rectifiers included in the amplifiers cause uni-directional currents to flow in loads connected to the outputs of amplifiers 47 and 48 when the input signal fed to these amplifiers is in phase with the reference voltage, or 180° out of phase with the reference voltage, according to the desired method of operation.

A coil 49 of a relay 50 is connected to the output of the amplifier 47. When the simulated aircraft is on the glide path, no signal is fed to the input of amplifier 47 and contacts 51, 51' of the relay 50 are closed. When the simulated aircraft is above the glide path, the phase of the signal fed to terminal 43 corresponds to that of the signal fed to terminal 38. Current then passes through the coil 49 and the contacts 51, 51'' are closed. The contacts 51', 51'' are connected respectively to solenoids 52, 53 of an illuminating unit 54.

The unit 54 illuminates with white or with red light, one face of an optical prism 55. The prism 55 is mounted so as to project through the surface of a model 56, over which simulated flights take place. The unit 54 is mounted beneath the model 56 and the prism 55 is aligned to direct the emergent light beam in the direction towards the threshold of the runway. The prism 55 is shaped to restrict the light beam, in a vertical plane, within an angle subtending approximately 10° above the surface of the model and to restrict the light beam, in a horizontal plane, to an angle of 15° on each side of the centre of the runway. The prism 55 is masked along its face 57 to provide three apertures. These apertures correspond to the three light sources 13, 13' and 13" of the actual system shown in FIG. 1.

In the illuminating unit 54, white light from an electric lamp source 58, is directed through a slit 59 and through a two-section light filter 60 and is focused by a convex lens 61 onto the prism 55. The filter 60 is mechanically coupled to armatures of the solenoids 52 and 53, as indicated by the broken lines. Lateral movement of the filter 60 is provided by energizing these solenoids selectively. One-half of the filter 60 is transparent and the other half, indicated by the shaded area 60', is red. The red portion is brought into the light beam, when the simulated aircraft is on the glide path. To this end, the solenoid 52 is energized, through closed contacts 51 and 51', from a source of direct current connected to terminal 62. The transparent portion of the filter is brought into position when the simulated aircraft is above the glide path, when the solenoid 53 is energized via closed circuits 51, 51".

The coil 63 of a relay 64 is connected to the output of amplifier 48. When the simulated aircraft is on the glide path, no signal is fed to the input of the amplifier 48 and contacts 65 and 65' of the relay 64 are closed. When the simulated aircraft is below the glide path, the phase of the signal fed to terminal 45 of amplifier 48 corresponds to that of the signal fed to terminal 37. Current is then passed through coil 63 and the relay contacts 65 and 65" are closed. The contacts 65' and 65" are connected respectively to solenoids 66 and 67 of an illuminating unit 68.

In the illuminating unit 68, light from an electric lamp source 69, is directed onto a prism 70, by way of a slit 71, light filter 72 and lens 73, in a manner similar to that of the unit 54. One-half of the filter 72 is transparent and the other half is red. The transparent portion is brought into position when the solenoid 66 is energized, through closed contacts 65 and 65', from a source of direct current connected to terminal 62'. The red portion of the filter 72 is brought into position when the solenoid 67 is energized through closed contacts 65 and 65'. The prism 70 is masked and is positioned on the surface of the model 56 to represent the three sources 11, 11' and 11" of FIG. 1. The filaments of the lamps 58 and 69 in the units 54 and 68 are fed with direct current, by way of variable resistor 74, from a source connected to terminal 75. The brightness of the lamps may be varied by the resistor 74 to simulate day or night operating conditions.

Prisms corresponding to sources 12, 12', 12" and 14, 14', 14" of FIG. 1 are also included in the model and are illuminated by units similar to units 54 and 68. The solenoids of these units are connected to relay contacts 51', 51" and 65', 65", so that the light from sources 11, 11', 11" and 12, 12', 12", which forms one light bar, and the light from sources 13, 13', 13" and 14, 14', 14", which forms the other light bar, is of the same color in each case.

Thus, the visual effects produced by the system, as seen by the camera when a simulated approach is being made, correspond realistically to those observed in actual flight. That is to say, two white bars are seen by a trainee pilot, flying above the glide path, two red bars are seen when flying below the glide path, and one white and one red bar are seen when flying on the glide path, the white bar being the nearer of the two bars visible.

In the simulating system described above, the transitory pink stage observed in actual flight when passing through the red and white beam of each bar of the actual indicating system, is simulated in an approximate manner as the light filters of the illuminating units move across the corresponding light beams. The duration of the period of transit of the filters may be adjusted, using mechanical delay units, to provide a satisfactory compromise in conditions when the simulated path of the aircraft passes through the transitional pink zone but a system providing more faithful simulation must be used if effects are to be provided corresponding to those which occur, for example, when the flight path is wholly within a pink sector.

Figure 4:
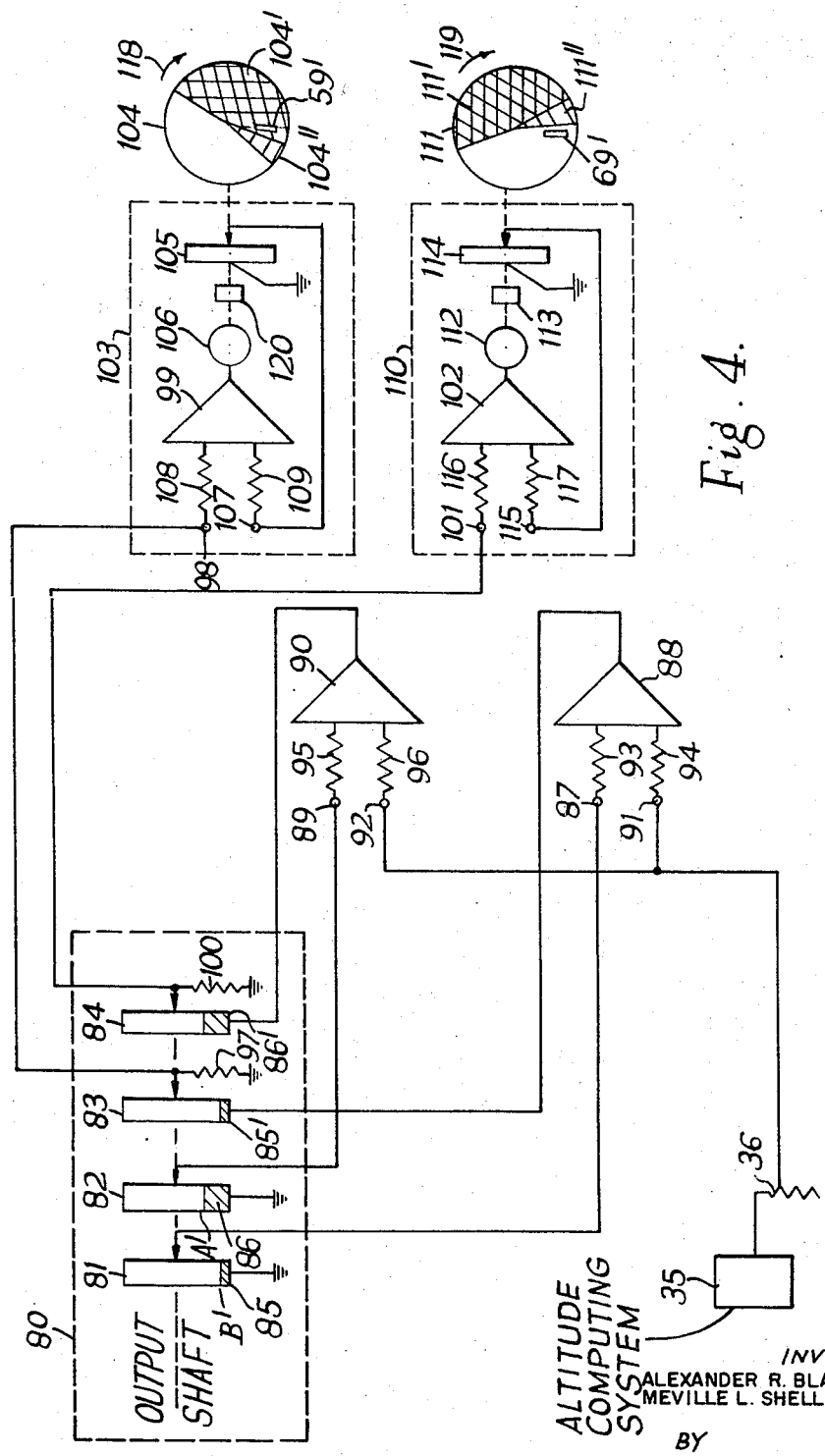
FIG. 4 is a schematic diagram showing an arrangement providing more accurate simulation of the visual glide slope system.

One form of such a system is shown in FIG. 4. In the figure, potentiometers 81, 82, 83 and 84 are driven by the output shaft of a computing servo unit 80. The unit 80 is generally similar to the servo 20 of FIG. 3 and is similarly fed with a "distance from runway" signal derived from the I.L.S. computer of the flight simulator. The windings of potentiometers 81 and 82 are connected to earth and to the source of alternating current used to supply the computing systems of the flight simulator.

The ideal glide path is defined by electric signals derived from the wipers of potentiometers 81 and 82. The amplitudes of the signals from the wipers of potentiometers 81 and 82 increase linearly from zero with increasing distance of the wipers from positions B' and A', respectively. A portion of the winding of potentiometer 81 is shorted out for a distance, indicated by the shaded area 85, corresponding to the distance between the localizer transmitter and the light source B in FIG. 2. A portion of the winding of the potentiometer 82 is shorted out for a distance, indicated by the shaded area 86, corresponding to the distance between the localizer transmitter and the light source A in FIG. 2.

The signal from the wiper of potentiometer 81 is fed to input terminal 87 of an amplifier 88 and the signal from the wiper of potentioneter 82 is fed to input terminal 89 of an amplifier 90. A signal from potenometer 36, associated with the height computing system 35, is fed to input terminal 91 of amplifier 88 and to terminal 92 of amplifier 90. The signal fed to terminals 91 and 92 is in opposite phase relationship to that of the signals fed to terminals 87 and 89. Terminals 87 and 91 are connected to the input of amplifier 88 by way of summing resistors 93 and 94. The values of these resistors are chosen so that the input voltage to amplifier 88 is zero when the height of the simulated aircraft, at the distance represented by the input signal fed to the servo unit 80, corresponds to the upper limit of the glide path, shown as BU in FIG. 2.

Terminals 89 and 92 are connected to the input of amplifier 90 by way of summing resistors 95 and 96. The values of these resistors are chosen so that the input voltage to amplifier 90 is zero when the height of the simulated aircraft, at the distance represented by the input signal fed to the servo unit 80, corresponds to the lower limit of the glide path, shown as AL in FIG. 2.

The output signals from the amplifiers 88 and 90 are fed to the windings of potentiometers 83 and 84, respectively. A resistor 97 is connected to the wiper of potentiometer 83 and to earth, so that an increasing fraction of the output signal from the amplifier 88 is provided at the wiper, as the simulated aircraft approaches the runway. The signal from the wiper of potentiometer 83 is fed to an input terminal 98 of a servo amplifier 99. The wiper of potentiometer 84 is, in like manner, connected to a resistor 100, so that a controlled fraction of the output signal of the amplifier 90 is fed to an input terminal 101 of a servo amplifier 102.

Part of the winding of potentiometer 83, indicated by shaded area 85', is permanently shorted out, so that the full output signal of amplifier 90 is fed to terminal 98 when the simulated aircraft reaches a position corresponding to that of the light source B of FIG. 2.

Part of the winding of potentiometer 84, indicated by shaded area 86', is shorted out so that the full output signal of amplifier 90 is fed to terminal 101 when the simulated aircraft reaches a position corresponding to that of the light source A of FIG. 2.

The amplifier 99 is part of a servo unit 103. The unit 103 is used to determine the angular position of a disc 104 which is placed in the light path of an alternative form of the illuminating unit 54 of FIG. 3. In this alternative unit, which is not shown, the slide 60, 60' of the unit 54, is replaced by the disc 104. The disc 104 is rotated by the servo unit to bring transparent, pink or red sectors into the path of the light beam, according to the magnitude and phase of the signal fed to input terminal 98.

In the servo unit 103, the output of amplifier 99 is fed to a motor 106, the output shaft of which drives a potentiometer 105 via a speed reduction gear 120. The winding of potentiometer 105 has a centre tap which is earthed. The winding is supplied from the source of alternating current used to supply the computing system of the associated flight simulator. Potentiometer 105 provides signals of increasing amplitude and of opposite phase relationship when the wiper is moved on one side or the other of the centre tap. The signal from the wiper of potentiometer 105 is fed to an input terminal 107 of amplifier 99 to "answer" the signal fed to input terminal 98. Terminals 98 and 107 are connected to the amplifier 99 by way of summing resistors 108 and 109, respectively. The values of these resistors are chosen so that when the simulated aircraft deviates from the glide path by an amount corresponding to the vertical width of the pink beam, the disc is rotated by a corresponding amount.

The amplifier 102 is part of a servo unit 110, which is used to position a disc 111 in the light path of an alternative form of the illuminating unit 68 of FIG. 3. The servo unit 110 includes an amplifier 102, a motor 112, a speed reduction gear 113 and a potentiometer 114, and is generally similar to the unit 103. An "answer" signal is fed to an input terminal 115. Terminal 101 and 115 are joined to the input of amplifier 102 by way of summing resistors 116 and 117.

The angular position of the filter discs 104 and 111 is determined by the magnitude and the phase of signals fed to the inputs of amplifiers 99 and 102. The magnitude and phase of these signals is determined by the height of the simulated aircraft at a given distance from the runway.

The phase relationship between the input and "answer" signals fed to the servo units 103 and 110 is such that the discs 104 and 111 rotate from a neutral position in the direction of arrows 118 and 119 when the height signal fed to amplifiers 88 and 90 is less than the glide path signal. The servo units 103 and 110 take up a neutral position when there is zero input to terminal 98 or to terminal 101.

The discs 104 and 111 each have a transparent sector of 175°, a red sector of 175°, indicated by cross-hatched areas 104' and 111', and a pink sector of 10°, indicated by shaded areas 104" and 111".

When the servo unit 103 is in a neutral position, the junction between the pink and red sectors is opposite a slit 59' corresponding to the slit 59 of FIG. 3. When the servo unit 110 is in a neutral position, the junction between the transparent and pink sectors is opposite a slit 71' corresponding to the slit 71 of FIG. 3.

Assuming the simulated aircraft to be an appreciable distance from the runway and making an approach on the ideal glide path, the height signal fed to terminal 91 exceeds the glide path signal fed to terminal 87. The servo 110 thus positions the disc 111 so that the light beam is within the transparent sector and the light emitted from the prisms, corresponding to A of FIG. 2, is white.

The glide path signal fed to terminal 89 then exceeds the height signal fed to terminal 92 and the servo 103 therefore positions the disc 104 so that the light beam is within the red sector and the light emitted by the prisms, corresponding to B of FIG. 2 is therefore red.

In the diagrams, the discs 104 and 110 are shown in positions corresponding to this condition.

The pink sectors on the disc are of fixed angular width and the discs co-operate with the slits over an arc having a fixed radius. The vertical width of the two pink beams becomes less and less as the distance from the runway decreases and it is therefore necessary to increase the magnitude of the signal fed to amplifiers 99 and 102 for a given difference between the height and glide path signals fed to amplifiers 88 and 90, if correct effects are to be provided by the system. The potentiometers 83 and 84 are provided for this purpose. The windings of these potentiometers are contoured so that the vertical widths of the pink beams decrease, in a substantially linear manner, with decreasing distance of the simulated aircraft from the simulated sources.

When the brightness of the sources 58 and 69 is varied by the control 74, undesirable colour temperature changes of the light sources may take place. In an alternative form of the illuminating units 54 and 68, which is not shown, a variable-density neutral grey light filter is interposed between the source 58 and the lens 61 and between the source 69 and the lens 73.

The neutral light filter is a light-transmitting disc, graded in density angularly from an arbitrary radius so that the intensity of the light transmitted by the filter changes as the disc is rotated about its centre. Each neutral filter disc is coupled at its centre to the shaft of a synchro receiver unit. The windings of the receiver units are connected to a synchro transmitter unit in a manner such that the discs take up a position corresponding to that of the shaft of the synchro transmitter unit. The shaft of the transmitter unit is set manually to a position corresponding to the time of day during which simulated exercises are taking place.

In embodiments where a television camera is used to view the model, it may be convenient to compensate for the relatively poor dynamic contrast range of the television camera compared with that of the human eye, by mechanically coupling the shaft of the transmitter synchro to the range computing system of the simulator, in a manner to cause the light intensity to be reduced as the simulated aircraft approaches the runway. If desired, the shaft of the synchro transmitter unit may be mechanically coupled to the range computing system of the simulator and to a manual control, to provide compensation and allow time-of-day adjustments to be made at the same time.

What we claim is:

1. Ground-based flight training apparatus for simulating visual effects corresponding to those provided to an aircraft in flight by a surface-located visual navigational aid, comprising a representation of a landing area, an optical viewing device for viewing a portion of the representation, means for providing relative movement of the viewing device and the said representation, in accordance with computed simulated movement of an aircraft relative to the landing area, and means for displaying the scene viewed by said viewing device, including at least one light source associated with the representation, positioned correspondingly to a light projection unit of said visual navigational aid, and means for varying the character of the light transmitted from the said source of light in accordance with the computed simulated movement of the aircraft, whereby the scene displayed by the said display means shows visual effects corresponding to those provided by said visual navigational aid in relation to an aircraft following said simulated computed movement.

2. Flight training apparatus as claimed in claim 1, for simulating visual effects corresponding to those of a visual glide slope indicating system of the type providing a light beam having cross-sectional areas of different colour in predetermined relationship to the axis of the light beam, in which said means for varying the character of the light transmitted from the light source associated with the said representation varies the colour of the light transmitted from the said source in accordance with the computed simulated instantaneous displacement of the aircraft relative to a computed simulated axis of the light beam of the navigational aid.

3. Flight training apparatus as claimed in claim 2, for simulating visual effects corresponding to those of a visual glide slope indicating system of the type providing at least one light beam having its axis inclined upwardly at an angle to a landing surface, the light beam being split into upper and lower parts of different colours, in which said means for varying the character of the light transmitted from the light source associated with the said representation varies the colour of the light transmitted from the said in accordance both with the computed simulated simulated instaneous height of the aircraft above the simulated landing surface level and the horizontal distance of said aircraft from a reference point on said landing surface.

4. Flight training apparatus as claimed in claim 3, having at least one light source mounted below the surface of the said representation, optical means for directing a light beam from said light source through the surface of said representation and upwardly at a required angle thereto and a light filter intermediate said light source and said optical directing means, said light filter having parts of different colours and being mounted for movement in the light beam according to the said computed simulated aircraft position.

5. Flight training apparatus as claimed in claim 4, in which said light filter is arranged to provide a transitional region wherein the colour of the light transmitted varies progressively with movement of the said light filter intermediately of said different colours.

6. Flight training apparatus as claimed in claim 5, in which the light filter has adjacent parts of different colours and is moved in the light beam so that, in a transitional region of the filter movement, the light beam passes partially through both colour parts of the filter.

7. Flight training apparatus as claimed in claim 5, in which the light filter is circular with angularly spaced sectors of different colours and an intermediate sector of intermediate colour, the said light filter being mounted for rotational movement through the light beam.

8. Flight training apparatus as claimed in claim 4, having a computing servo mechanism supplied with a signal representing the instantaneous horizontal distance of the simulated aircraft from a reference position on the landing surface, said computing servo mechanism operating to compute the height of the axis of the projected light beam in accordance with the upward angle thereof relative to the landing surface and to provide a signal corresponding to said computed beam axis height, and signal comparison means having two inputs supplied one with said signal representing computed beam axis height and the other with a signal representing the instantaneous height of the simulated aircraft above the landing surface level, the output of said signal comparison means being used to move said light filter according to which input signal is the greater.

9. Flight training apparatus as claimed in claim 4, having a computing servo mechanism supplied with a signal representing the instantaneous horizontal distance of the simulated aircraft from a reference position on the landing surface, said computing mechanism operating to compute the height of the axes of at least two projected light beams, directed upwardly from longitudinally spaced points along said landing surface, in accordance with the source and upward angle of said light beams relatively to the landing surface and to provide a signal corresponding to said computed height of each beam axis, signal comparison means associated with each projected light beam, each having two signal inputs, the one comprising said signal of computed beam height of the associated projected light beam and the other input comprising a signal common to every said signal comparison means, representing the instantaneous height of the simulated aircraft above the landing surface level, the output of each said signal comparison means being used to move the light filter of the corresponding light beam according to which input signal to the associated signal comparison means is the greater.

10. Flight training apparatus as claimed in claim 1 in which the said representation is a scale model of an airfield and its surroundings showing a runway, the light sources are mounted beneath the model, each with an associated optical projection device, a prism for each light source being mounted in the model in realistic relation to said runway, extending through the surface of the model, to provide an upwardly directed light beam therefrom.

11. Flight training apparatus as claimed in claim 5 having a computing servo mechanism supplied with a signal representing the instantaneous horizontal distance of the simulated aircraft from a reference position on the landing surface, said computing servo mechanism operating to compute the height of the axis of the projected light beam in accordance with the upward angle thereof relative to the landing surface and to provide a signal corresponding to said computed beam axis height, and signal comparison means having two inputs supplied one with said signal representing computed beam axis height and the other with a signal representing the instantaneous height of the simulated aircraft above the landing surface level, the output of said signal comparison means being used to move said light filter according to which input signal is the greater.

12. Flight training apparatus as claimed in claim 6 having a computing servo mechanism supplied with a signal representing the instantaneous horizontal distance of the simulated aircraft from a reference position on the landing surface, said computing servo mechanism operating to compute the height of the axis of the projected light beam in accordance with the upward angle thereof relative to the landing surface and to provide a signal corresponding to said computed beam axis height, and signal comparison means having two inputs supplied one which said signal representing computed beam axis height and the other with a signal representing the instantaneous height of the simulated aircraft above the landing surface level, the output of said signal comparison means being used to move said light filter according to which input signal is the greater.

13. Flight training apparatus as claimed in claim 5 having a computing servo mechanism supplied with a signal representing the instantaneous horizontal distance of the simulated aircraft from a reference position on the landing surface, said computing mechanism operating to compute the height of the axes of at least two projected light beams, directed upwardly from longitudinally spaced points along said landing surface, in accordance with the source and upward angle of said light beams relatively to the landing surface and to provide a signal corresponding to said computed height of each beam axis, signal comparison means associated with each projected light beam, each having two signal inputs, the one comprising said signal of computed beam height of the associated projected light beam and the other input comprising a signal common to every said signal comparison means, representing the instantaneous height of the simulated aircraft above the landing surface level, the output of each said signal comparison means being used to move the light filter of the corresponding light beam according to which input signal to the associated signal comparison means is the greater.

14. Flight training apparatus as claimed in claim 6 having a computing servo mechanism supplied with a signal representing the instantaneous horizontal distance of the simulated aircraft from a reference position on the landing surface, said computing mechanism operating to compute the height of the axes of at least two projected light beams, directed upwardly from longitudinally spaced points along said landing surface, in accordance with the source and upward angle of said light beams relatively to the landing surface and to provide a signal corresponding to said computed height of each beam axis, signal comparison means associated with each projected light beam, each having two signal inputs, the one comprising said signal of computed beam height of the associated projected light beam and the other input comprising a signal common to every said signal comparison means, representing the instantaneous height of the simulated aircraft above the landing surface level, the output of each said signal comparison means being used to move the light filter of the corresponding light beam according to which input signal to the associated signal comparison means is the greater.

No references cited.

MALCOLM A. MORRISON, *Primary Examiner.*

A. J. SARLI, *Assistant Examiner.*